United States Patent [19]

Sagan

[11] Patent Number: 5,136,421
[45] Date of Patent: Aug. 4, 1992

[54] THERMAL IMAGING SYSTEM AND METHOD USING SCENE-AVERAGE RADIATION AS A THERMAL REFERENCE

[75] Inventors: Stephen F. Sagan, Plano, Tex.

[73] Assignee: Texas Instrument Incorporated, Dallas, Texas.

[21] Appl. No.: 546,602

[22] Filed: Jun. 29, 1990

[51] Int. Cl.$^5$ ............................ G01J 5/48; G01J 5/54; G02B 5/04
[52] U.S. Cl. .................................. 359/351; 359/353; 359/726; 359/834; 250/347; 250/353
[58] Field of Search ................. 350/1.2, 1.1, 445, 446, 350/286, 6.6, 622, 569, 447; 250/330, 334, 342, 347, 353

[56] References Cited

U.S. PATENT DOCUMENTS

| 4,158,136 | 6/1979 | Felix et al. ........................... 250/330 |
| 4,873,442 | 10/1989 | Klatt ...................................... 250/334 |

FOREIGN PATENT DOCUMENTS

| 60827 | 5/1980 | Japan .................................. 250/330 |
| 60913 | 5/1980 | Japan .................................. 350/1.2 |

*Primary Examiner*—Jon W. Henry
*Attorney, Agent, or Firm*—Richard Donaldson, René E. Grossman

[57] ABSTRACT

A pupil/image reversal prism (FIG. 2) forms a pupil at an image location. Such a prism has specific applicability in a DCR scheme for a thermal imaging system (FIG. 3a, 31 and 32) in which a passive DCR source is implemented by a pupil imager that forms a pupil onto the image of a thermal scene, thereby providing scene-average radiation to a thermal detector array. The pupil/image reversal prism including an input reflective surface (A), an output reflective surface (B), a positive reflective surface (C) and an intermediate folding reflective surface (D). The reflective surfaces A and B use total internal reflection to provide both transmissive and reflective operation.

19 Claims, 3 Drawing Sheets

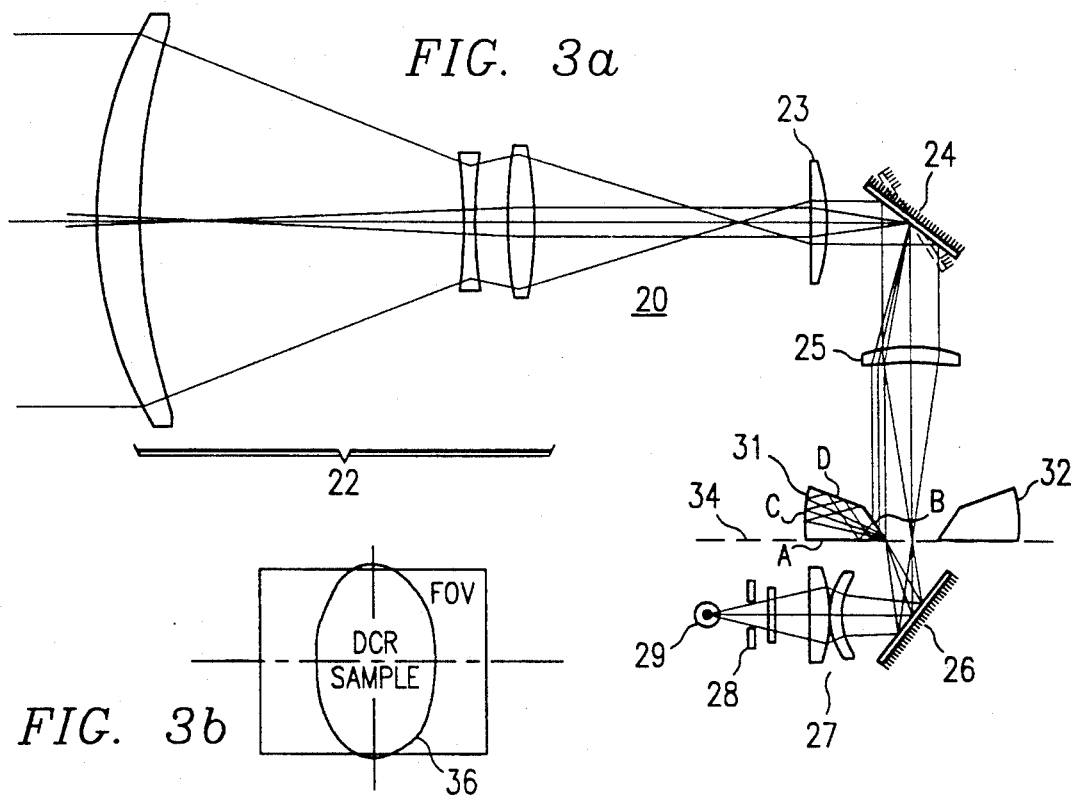
FIG. 3a
FIG. 3b
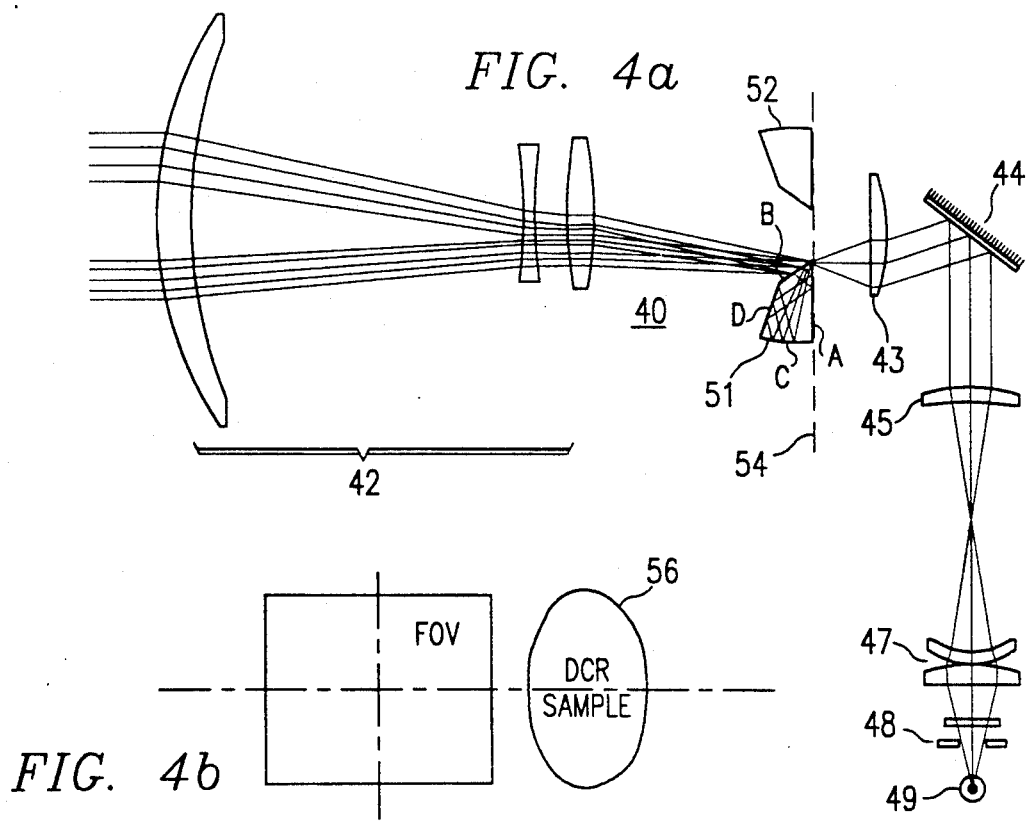
FIG. 4a
FIG. 4b

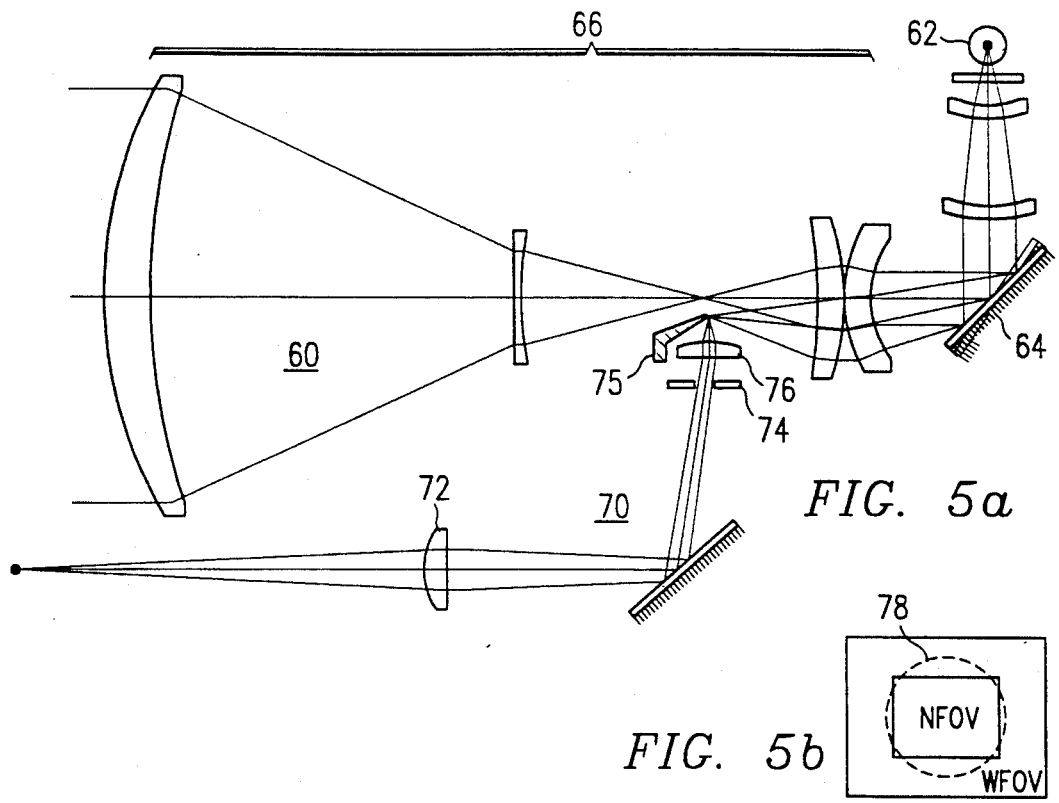
FIG. 5a
FIG. 5b
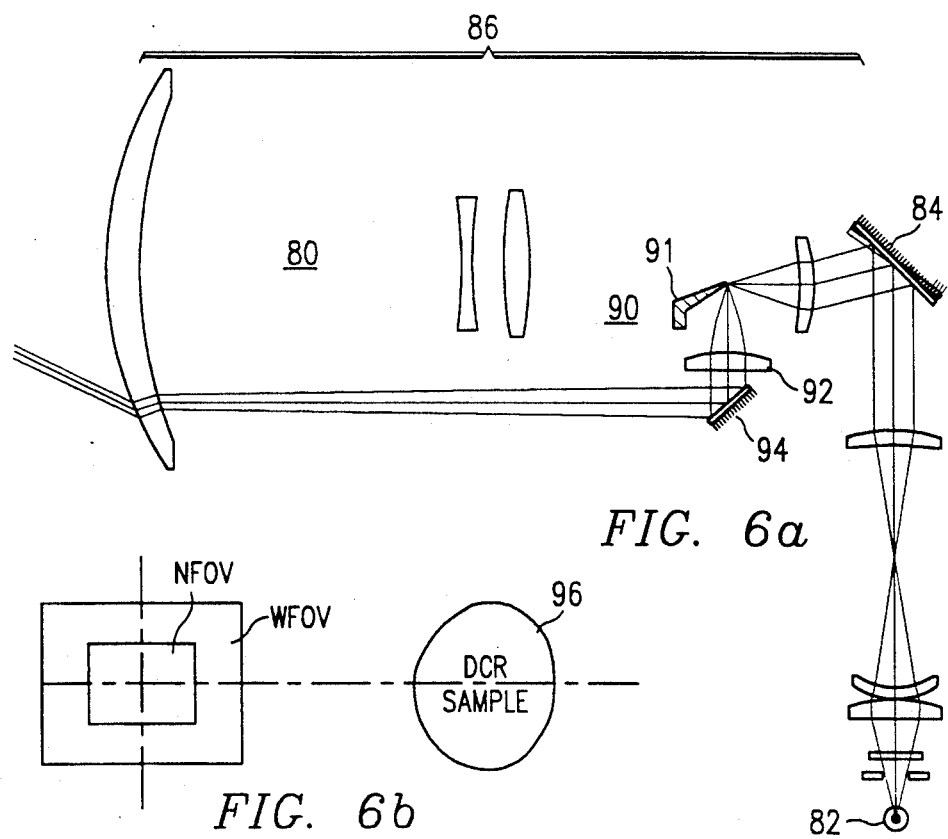
FIG. 6a
FIG. 6b

THERMAL IMAGING SYSTEM AND METHOD USING SCENE-AVERAGE RADIATION AS A THERMAL REFERENCE

TECHNICAL FIELD OF THE INVENTION

The invention relates generally to optical imaging systems, and more particularly relates to a pupil/image reversal device for forming a pupil at a selected image location, one application of which is in a thermal imaging system for providing a passive thermal reference source for normalizing or DC restoring (DCR) the thermal image detectors by imaging a pupil onto a thermal image scene.

BACKGROUND OF THE INVENTION

The performance and display quality of a thermal imaging system is often improved by normalizing or DC restoring (DCR) the output of the detectors of the thermal detector array using some DCR thermal reference source. These DCR sources have typically been active temperature sources driven to track the average temperature of a scene, although passive (non-temperature controlled) sources have been used in some applications.

The specific problem to which the invention can be applied is to implement, in a thermal imaging system, a passive DCR source by providing scene-average radiation to each thermal image detector. Preferably, such a passive DCR source would have the following optical characteristics: (a) use of the actual imaged scene as the DCR scene, (b) use of a common input aperture for both imaging and DCR, and (c) presentation of the same scene-average temperature to each detector.

Thermal imaging systems using active DCR sources, such as thermal electric coolers (TECs), are disadvantageous in a number of respects. They require drive electronics and heatsinks, and are limited in performance by response time and dynamic range. They also suffer reliability problems when they must be controlled over a wide temperature range in short periods of time.

Passive DCR sources have been used to avoid the disadvantages associated with active DCR sources. These passive DCR sources are non-temperature controlled, providing each detector with a thermal reference, such as by using scene defocusing techniques to present a local scene-average to each detector.

Thermal imaging systems may be staring systems or scanned systems in which the detector array is scanned across a scene. In staring systems, DCR is interleaved with image reading operations. In scanned systems, DCR is usually performed during the inactive portion of the scanning cycle.

This inactive period (typically on the order of 20 percent of the field rate) begins and ends at the edges of the scanned field, and includes the turnaround period and (for one-way scanned systems) the scanner retrace period. Typically, DCR is implemented by overscanning the image field to some degree.

Using an overscan period for the DCR process impacts the configuration of the DCR optics, as well as integration into the thermal imaging system optics. In particular, injecting a DCR thermal reference source into the overscan optical path very close to an intermediate image, where the optical bundle for each detector is smallest, reduces the amount of overscan required, and therefore reduces the negative impact the DCR process has on scan efficiency.

FIG. 1 illustrates a conventional scanned thermal imaging system with an active DCR source, in this case a TEC. The TEC is positioned at a DCR aperture stop that, during the overscan period, is imaged onto the scanner, the same location that the system aperture stop is imaged.

That is, during the overscan period, the optical path is broken and the detector array sees the TEC through a DCR pupil (the image of the DCR stop on the scanner), rather than the scene through the system pupil. The optical effect of imaging a pupil onto a scene is to, in effect, create an amount of defocus such that the optical energy from the scene through the pupil constitutes an average of all scene radiation (i.e., all thermal image information is lost, and the uniform scene-average temperature is provided). When the images of the two aperture stops (the system aperture stop and the DCR aperture stop) are designed to appear the same size for each detector, each detector in the array sees the entire DCR source, permitting proper DCR restoration.

Accordingly, a specific need exists for an optical scheme for implementing a passive DCR source that provides a uniform DCR thermal reference to each of the detectors in a thermal imaging system. A more general need exists for an optical design for imaging a pupil at a desired location, which could be used as such a passive DCR source.

SUMMARY OF THE INVENTION

The invention is a pupil/image reversal device for forming a pupil at an image location. Such an optical device would have specific applicability in a DCR scheme in which a passive DCR source is implemented by a pupil imager that forms a pupil onto the image of a thermal scene, thereby providing scene-average radiation to a thermal detector array.

In one aspect of the invention, the image/pupil reversal device is incorporated into an optical system, and includes an a positive reflective component (with positive power) and input/output optics. The input/output optics intercepts an input optical bundle incident from the optical system, and after a predetermined number of fold paths within the pupil/image reversal prism, reintroduces it into the optical system.

The positive reflective element and the input/output optics are cooperatively configured such that, within the pupil/image reversal device, the optical bundle is directed along a predetermined number of fold paths, at least one of which includes the positive reflective element, until being directed on an exit path to the input/output optics, such that the focused and folded optical bundle forms a pupil at a desired image location.

In another aspect of the invention, in a thermal imaging system, a DCR scheme for providing a passive DCR source is implemented by, during selected DCR intervals, redirecting the optical path for the detector array to include a DCR imaging path. In the DCR imaging path, optical operations are performed to form a pupil (an image of the system aperture stop or its equivalent) onto an image of the thermal scene, thereby providing scene-average radiation to the detector array. The pupil imaging function can be implemented by the image/pupil reversal device.

In more specific aspects of the pupil/image reversal device, the device is implemented as a prism in which the input/output optics include an input reflective element and an output reflective element. The input and output reflective elements are configured to be transmissive to an optical bundle incident at transmit-angles of incidence, and reflective to an optical bundle incident at a reflect-angles of incidence.

In operation, an optical bundle incident to the input reflective component at a transmit-angle of incidence is intercepted into the prism. The optical bundle travels within the prism along predetermined internal fold paths incident to the input and output reflective elements at reflect-angles of incidence. After the predetermined number of fold paths within the prism, the optical bundle is directed to the output reflective element on an exit path that is at a transmit angle of incidence, thereby exiting the prism.

The pupil/image reversal device can include at least one intermediate folding surface that reflects the incident optical bundle along a predetermined path, thereby providing the degree of design freedom to precisely image the pupil at an image.

The pupil/image reversal device can be configured as a prism in a refractive immersion medium, thereby decreasing the curvature required for the positive reflective component. For an immersed prism, the input/output and positive reflective elements, and any intermediated folding elements, comprise surfaces on the prism faces. Preferably, the input and output reflective surfaces use total internal reflection as the reflective mechanism, and input and output reflective surfaces are coated with an anti-reflection coating.

In an exemplary application of the pupil/image reversal prism in the DCR scheme, the DCR optics include the prism located at an intermediate image, preferably in the imager optics of the thermal imaging system. At selected intervals, an index mirror diverts the optical path to the prism, which intercepts the optical bundle, folds it along predetermined optical paths, and reintroduces the optical bundle into the optical path of the thermal imaging system, such that a pupil is formed at an intermediate image plane. As a result, each detector is provided with scene-average radiation as a thermal reference.

Furthermore, a second thermal reference can be provided by using two prisms in the DCR optics, one with a full anti-reflective (AR) coating on the input/output reflective surfaces, and one without AR coating (or with a partial AR coating or even an absorptive coating). The prisms are coupled into the optical path of the thermal imaging system at pre-assigned respective DCR intervals (such as at opposite overscan-periods of the normal thermal image scan). As a result, in DCR intervals involving the AR coated prism the detectors will see scene-average radiation through the pupil image formed by the prism (the first thermal reference), while during DCR intervals involving the non-AR coated prism the detectors will see a composite of scene-average radiation and radiation from the detector array itself that has been reflected back from the prism (the second thermal reference).

The technical advantages of the invention include the following. The pupil/image reversal device can be selectively coupled into an optical path to intercept the optical bundle, fold and focus it, and reintroduce it into the optical path so as to form a pupil at an image location. One application of the pupil/image reversal device is in a DCR scheme in which a pupil imager (such as the pupil/image reversal device) is used as a DCR passive thermal reference source to provide, during DCR intervals, scene-average radiation to the detector array. The pupil/image reversal device can be fabricated as an immersed prism, with the optical elements of the device being formed as surfaces of the prism. In the DCR application, a pupil/image reversal prism can be integrated into the thermal imaging system and configured to present, as selected DCR intervals, the same scene-average thermal reference to each detector. Two separate thermal references can be provided to the detector array by, for example, using two pupil/image reversal prisms, one without an AR coating so that it causes the detector array to see a composite thermal reference of the scene-average radiation (through the pupil formed by the prism) and radiation reflected from the prism.

BRIEF DESCRIPTION OF THE DRAWINGS

For a more complete understanding of the invention, and for further features and advantages, reference is now made to the following Detailed Description of an exemplary embodiment of the invention, taken in conjunction with the accompanying Drawings, in which:

FIGS. 3a and 3b illustrate an application of the pupil/image reversal prism used as a passive DCR source in a thermal imaging system, with dual prisms being located in the imager optics (FIG. 3b indicates the relationship between the DCR thermal reference sample provided by a prism and the normal field of view);

FIGS. 4a and 4b illustrate an application of the pupil/image reversal prism used as a passive DCR source in a thermal imaging system, with dual prisms being located in the afocal optics (FIG. 4b indicates the relationship between the DCR thermal reference sample provided by a prism and the normal field of view);

FIGS. 5a and 5b illustrate an alternative passive DCR source using pupil imaging to provide scene-average radiation as a thermal reference, with the front lens of the imaging system being used off-axis for DCR imaging; and FIGS. 6a and 6b illustrate an alternative passive DCR source using pupil imaging to provide scene-average radiation as a thermal reference, with a separate input port being used for DCR imaging.

DETAILED DESCRIPTION OF THE INVENTION

The Detailed Description of exemplary embodiments of the pupil/image reversal device for imaging a pupil at an intermediate image is organized as follows:

1. Pupil/Image Reversal Prism
2. Thermal-Imaging DCR Using Pupil Imaging
  2.1. Prism-In-Imager Embodiment
  2.2. Prism-In-Afocal Embodiment
  2.3. Providing Two Thermal References
  2.4. Alternative Pupil Imagers
3. Conclusion A pupil/image reversal prism is an exemplary embodiment in which the pupil/image reversal device is immersed in refractive glass, the surfaces of which form the optical elements of the device.

An exemplary application of the pupil/image reversal prism is in a thermal imaging system to implement a DCR scheme in which a pupil imager (such as the pupil/image reversal prism) is used to image a pupil of the thermal imaging optics onto the thermal image scene (or an image of the scene), thereby providing a scene-average thermal reference for normalizing or DC restoring (DCR) the thermal image detectors. Such an exemplary application illustrates various optical design considerations. Those skilled in the art recognize that implementing a pupil/image reversal prism in accordance with this invention for other applications involves routine design choices in selecting an optimum configuration.

1. Pupil/Image Reversal Prism. The pupil/image reversal device of the invention includes two principal optical components—a reflective element with positive power and input/output optics for intercepting the optical bundle, directing it to the reflective element and reintroducing it into the optical path. In the exemplary embodiment, these components are implemented by a pupil/image reversal prism.

Figure 1:
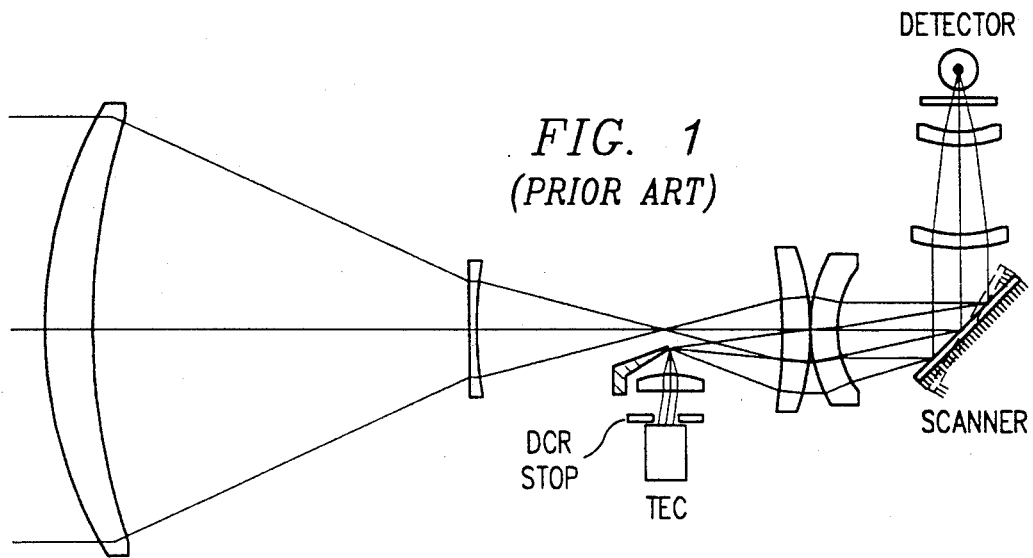
FIG. 1 illustrates a prior art active DCR source configuration using a TEC.
Figure 2:
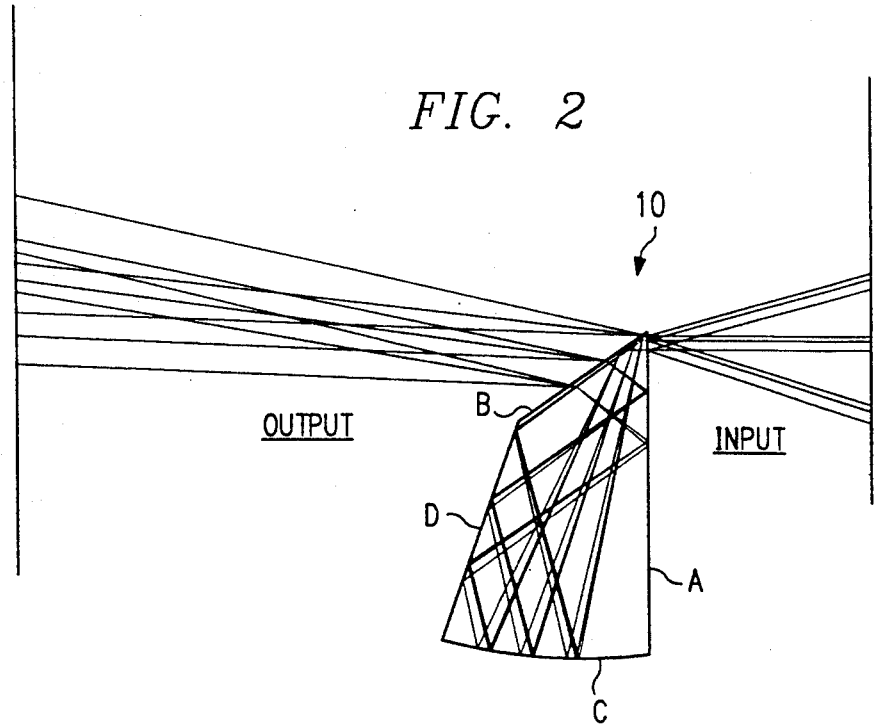
FIG. 2 illustrates a pupil/image reversal prism according to the invention.

FIG. 2 illustrates the exemplary pupil/image reversal prism 10 with an Input and Output side. The pupil/image reversal prism includes a positive reflective surface C (i.e., a reflective surface with a selected positive power), and three input/output elements—input TIR surface A, output TIR surface B, and intermediate fold surface D.

Positive reflective surface C is substantially totally reflective, as is intermediate fold surface D, while input/output TIR surfaces are transmissive at transmit-angles of incidence and reflective at reflect-angles of incidence. The positive reflective surface C is coated reflective, while input/output TIR surfaces A and B and fold surface D use total internal reflection (TIR) for reflection.

In addition to providing both transmissive and reflective modes, using TIR for surfaces A and B is advantageous because it reflects the optical bundles with substantially 100 percent efficiency. Alternatively, the surfaces of the prism could use TIR for positive reflective surface C, and selective coatings for surfaces A,B and D as required by the refractive immersion medium.

The optical path through pupil/image reversal prism 10, from the point of view of the Input side of the prism, can be described as follows.

The optical bundle passes through the input TIR surface A at a transmit-angle of incidence. Upon entering the prism, the optical bundle is incident (path AB1) to output TIR surface B at a reflect-angle of incidence, and is TIR reflected toward positive reflective surface C (path BC).

The optical bundle reflects from positive reflective surface C, toward intermediate fold surface D (path CD) at a reflect angle of incidence, and is TIR reflected toward input TIR surface A (path DA) at a reflect-angle of incidence. At the input TIR surface A, the optical bundle is TIR reflected toward output TIR surface B at a transmit-angle of incidence (path AB2).

The optical bundle exits the pupil/image reversal prism 10 through the output TIR surface B.

The pupil/image reversal prism can be configured to form a pupil at an intermediate image of the optical system. That is, the prism can be integrated into an optical system such that, under predetermined conditions, the optical bundle from the normal optical path is intercepted by the prism at input TIR surface A, folded within the prism, and reintroduced through output TIR surface B into the normal optical path, such that a pupil is formed (apparent or real) at an intermediate image.

For a given optical system, the prism can be configured for reversing pupil and image by the appropriate selection of the focusing power of positive reflective surface, and prism geometry as reflected in the orientation of the input/output reflective elements A, B and D relative to the positive reflective surface C. In particular, the power of the positive reflective surface C controls the size of the optical bundle and the formation of the pupil, while the arrangement of the internal optical paths between the positive reflective surface and the input/output reflective elements A, B and D control the location at which the pupil is formed.

Accordingly, the power of positive reflective surface C and the total optical distance within the prism represented by paths BC and CDAB are selected to provide a desired pupil size at a desired location, and subsequent images of the detector at desired locations.

As an alternative to configuring the pupil/image reversal device as an immersed prism, an equivalent device could be configured in air. The advantage of immersion is that the curvature required for a desired power is reduced by the refractive index of the prism material. For example, for the exemplary application of the pupil/image reversal prism in a thermal imaging system described in Section 2, the recommended immersion medium is zinc selenide which has a refractive index of about 2.4 for thermal IR frequencies.

The angle of incidence of the optical bundle at the output TIR surface B should be such that the exiting bundle passes through the remaining optical elements of the optical system without being vignetted or obscured.

Three input/output elements are optimum, but are not required—intermediate fold surface D may be eliminated. However, without optical element D, the prism may not be able to form a pupil precisely on an intermediate image plane, and provide full pupil image reversal.

The air/glass interface at the input and output TIR surfaces A and B are normally reflective to a certain degree. For most applications, such reflection is undesirable, and anti-reflection (AR) coatings are used to substantially eliminate reflections at transmit-angles of incidence. However, for some applications, a selected amount of reflection is desired, and the AR coatings can be adjusted or eliminated accordingly (see Section 2.3).

2. Thermal-Imaging DCR Using Pupil Imaging. An exemplary application of the pupil/image reversal prism is in a thermal imaging system to implement a DCR scheme for providing a passive DCR source using pupil imaging.

In the DCR scheme, DCR optics include a pupil imager—such as the pupil/image reversal prism—the is used to form a pupil of the thermal imaging optics onto an image of the scene (and consequently on the thermal scene). The optical effect of imaging a pupil onto a scene is to, in effect, create an amount of defocus such that the optical energy from the scene constitutes an average of all scene radiation within the pupil formed at the scene (i.e., all thermal image information is lost, and a uniform scene-average temperature is provided).

The exemplary thermal imaging system is a scanned optical system used to image a thermal image scene or source onto a detector array. In conventional terms, the detector array is scanned across the scene, providing a thermal image of the scene that can be converted using conventional thermal image processing into a useable image.

FIG. 3a illustrates the principal components of the thermal imaging system 20. Infrared radiation from a thermal scene is focused by objective 22 and eyepiece 23 toward a scanner 24. The objective optics and the eyepiece together form an afocal telescope.

For the exemplary embodiment of the thermal imaging system, scanner 24 includes a conventional mechanically driven scanner that scans in one direction. The overscan periods of the scanner can be controlled to provide, at either or both ends, an inactive period for DCR source injection.

The scanned scene image is directed through imager objective 25 to an index/fold mirror 26. The reflected scene image is directed through a relay 27, and a system aperture stop 28, to a linear detector array 29. Imager objective 25 and imager relay 27 form the imager for the thermal imaging system.

2.1. Prism-In-Imager Embodiment. Referring to FIG. 3a, for the exemplary application of the pupil/image reversal prism as a pupil imager for providing a DCR passive source, the DCR optics include a pupil/image reversal prism 31 located in the imager portion of the thermal imaging system. A second pupil/image reversal prism 32 is located symmetrically with respect to the optical axis—the prisms are configured such that each provides a different DCR thermal reference source, as described in Section 2.3.

The pupil/image reversal prisms 31 and 32 are shown located on the intermediate image plane 34 in the imager. That is, the input TIR surface A for each prism is located on the intermediate image plane. While not required, locating the prisms on the intermediate image plane, where the optical bundle for each detector is smallest, reduces the amount time required to move the optical bundle on and off the prism, and therefore reduces the negative impact the DCR process has on efficiency.

In normal operation, from the point of view of the detector array 29, the optical bundle passes through the imager optics (relay 27 and objective 25) to the scanner 24, and is scanned onto the thermal image scene through the afocal telescope optics (eyepiece 23 and objective 22). The system aperture stop 28 is imaged onto the scanner 24, forming the pupil for the detector array 29. The scene (through the pupil) is imaged at intermediate image plane 34, and then to the detector array.

The DCR process is to cause the pupil/image reversal prism(s) to intercept the optical bundle, and form a pupil at the intermediate image plane 34, providing scene average radiation to the detector array 29. For the exemplary embodiment, the DCR process is performed during the overscan (inactive) periods of the normal thermal imaging scan.

Only the operation of pupil/image reversal prism 31 will be described in this Section, the operation of prism 32 is described in Section 2.3.

From the point of view of the detector, the index/fold mirror 26 is used to selectively deviate the path of the optical bundle to pupil/image reversal prism 31 during an overscan period. The prism intercepts the diverted optical bundle, which is input to the prism through input TIR surface A. The prism operates as described in Section 1 to fold the optical path and form a pupil for the detector at the intermediate image plane 34, providing scene-average radiation to each of the detectors of the array.

FIG. 3b illustrates the pupil 36 as formed by the pupil/image reversal prism, superimposed on the field of view (FOV) for the detector array. Because the prism is located in the imager and is used when the scanner is in an appropriate position, the field of view sampled is centered on the thermal image scene without any offset. That is, the inherent offset of the pupil formed by the prism relative to the optical axis of the imager is removed by the scanner at the appropriate point in the overscan.

Thus, the DCR process uses a portion of the same thermal scene that is normally viewed by the detector (i.e., the portion that is within the DCR sample).

2.2. Prism-In-Afocal Embodiment. FIG. 4a illustrates an alternate configuration for using the pupil/image reversal prism as the pupil imager of the exemplary DCR scheme for implementing a passive DCR source of scene-average radiation.

In this configuration, the DCR optics include the prism located in the afocal rather than the imager of the thermal imaging system, eliminating the need for an index mirror. Except for the elimination of the index/fold mirror (26 in FIG. 3a), the thermal imaging optics 40 are essentially the same as in FIG. 3a. Thus, thermal scene radiation is relayed by an afocal telescope—an objective 42 and an eyepiece 43—toward a scanner 45. The scanned scene is directed through the imager optics—an imager objective 45 and a relay 27—and a system aperture stop 48, to a linear detector array 49.

Again, a dual pupil/image reversal prism arrangement is shown, with prisms 51 and 52 being located at the intermediate image plane 54 in the afocal to reduce the impact of the DCR process on scan efficiency. Only the operation of the prism 51 is described in this Section.

DCR operations occur during the overscan (inactive) portions of the thermal image scan. From the point of view of the detector, the overscanned optical bundle is intercepted by the pupil/image reversal prism 51, which is input to the prism through input TIR surface A. The prism operates as described in Section 1 to fold the optical path and form a pupil for the detector at the intermediate image plane 54, providing scene-average radiation to each of the detectors of the array.

FIG. 4b illustrates the pupil 56 as formed by the pupil/image reversal prism in relation to the field of view FOV. Because the optical path for DCR is through the thermal imaging optics, the area used for DCR changes as the field of view is changed. However, because the prism is located in the afocal rather than the imager, the offset of the pupil formed by the prism at the intermediate image (adjacent to the imaged thermal scene) causes the DCR sample to be displaced relative to the field of view of the thermal imaging system (adjacent to the field of view). Consequently, the scene-average used for DCR imaging is only a representation of the actual thermal image scene, resulting in a certain amount of DCR distortion.

Thus, this prism-in-afocal configuration presents a design trade-off compared to the prism-in-imager configuration in Section 2.1. Locating the prism in the imager allows for no offset error in the DCR sample. However, it requires an index mirror, and the associated control elements, resulting in an attendant increase in cost, complexity and weight.

2.3. Providing Two Thermal References. Thermal imaging DCR provides an example of an application where two pupil/image reversal prisms can be used in an optical system—providing two separate thermal references.

Thermal image detectors are subject to both offset and gain errors. While normalization offset coefficients can be generated using only one thermal reference source, establishing normalization gain coefficients requires two separate thermal reference sources.

The dual prism configurations shown in FIGS. 3a and 4a are able to provide two separate thermal reference sources. The pupil/image reversal prisms are identically configured except that only one prism is fully AR coated. That is, one prism is fully AR coated so that its input/output reflective surfaces A and B are fully transmissive at transmit-angles of incidence. The other prism in either only partially AR coated, uncoated or coated with an absorber.

For example, for a dual prism configuration as illustrated in FIG. 3a in a thermal imaging system using a cooled detector array, pupil/image reversal prism 31 could be fully AR coated, while prism 32 could be uncoated so that its input and output reflective surfaces will reflect about 17 percent of the incident light for a chosen glass of zinc selenide. From the point of view of the detector, index/fold mirror 26 could be controlled to divert the optical bundle to one or the other prism during alternate overscan periods.

The AR coated prism 31 will operate as described in Sections 1 and 2.1, forming a pupil at the intermediate image plane 34, such that the detector sees a scene-average DCR sample with a first thermal reference temperature. However, when the detector looks through the uncoated prism, it sees a composite second thermal reference temperature that is partly the scene average DCR sample and partly the reflection of itself. Because the cooled detector is at a temperature much colder that anything encountered in normal ambient, this second thermal reference temperature will always be significantly less than the first thermal reference temperature, thereby insuring that the DCR process with dual prisms will always provide two separated thermal reference temperatures for normalizing the detector array.

Alternatively, a single pupil/image reversal prism could be use to provide two thermal reference temperatures by configuring the prism input/output reflective surfaces with two areas of different transmissive character. During each DCR operation, the input optical bundle would be directed through both areas, with the detector array seeing two different DCR samples as a result.

2.4. Alternative Pupil Imagers. The pupil imaging function on which the DCR process described in this Section 2 can be implemented other than by using the pupil/image reversal prism as the passive DCR source for providing a scene-average DCR thermal reference. Two such exemplary embodiments of DCR optics for using pupil imaging to provide a passive DCR source are shown in FIGS. 5a/5b and 6a/6b.

Referring to FIG. 5a, a thermal imaging system 60 includes DCR optics 70 that uses a separate DCR imaging input port. A detector 62 is scanned by a scanner 64 to view the scene through an afocal 66. At the same time, the scene is imaged by a DCR input lens 72 at a DCR aperture stop 74.

During the overscan period, the optical path is interrupted by a scene injector mirror 75, and the detector array sees the scene image through a DCR pupil (the image of the DCR stop on the scanner created by lens 76), rather than the scene through the system pupil (which is also imaged on the scanner during normal operation). When the images of the two aperture stops (the system aperture stop and the DCR aperture stop) are designed to appear the same size for each detector, each detector in the array sees the same DCR source, permitting proper DCR.

The shape and size of the area of the DCR sample 78 of the scene that is used for DC restoration is fixed. FIG. 5b illustrates the relationship between this DCR scene area and the fields of view for a two field of view thermal imaging system—narrow (NFOV) and wide (WFOV)—with a 2X magnification switch between fields. Since the field of view for the thermal imaging system is normally rectangular and the system aperture stop is normally circular, and consequently the DCR aperture stop is normally circular, some compromise is necessary (unless a fiber optic reformator is used to reshape the field). Over-sampling the narrow field of view can be used to minimize the under-sampling of the wide field of view.

Referring to FIG. 6a, a thermal imaging system 80 and DCR optics 90 uses a common input aperture for thermal imaging and DCR operations, although DCR imaging is performed off-axis.

During thermal imaging operations, a detector 82 is scanned by a scanner 84 to view the scene through an afocal 86. During an overscan period, scene injection mirror 91 interrupts the optical path, circumventing the imaging optical elements between the interrupted point and the front lens. The positive element 92 is used to form an image of the pupil at the image of the thermal scene formed by the front lens.

Like the configuration shown in FIG. 5a, the shape and size of the area of the DCR scene is fixed. FIG. 6b illustrates the displacement of the DCR scene relative to the field of view of the thermal imaging system. Consequently, the scene-average used for DCR imaging is only a representation of the actual thermal image scene, resulting in a certain amount of DCR distortion.

4. Conclusion. Although the invention has been described with respect to exemplary embodiments, various changes and modifications of the disclosed embodiments, as well as alternative embodiments, will be suggested to one skilled in the art. It is, therefore, intended that the invention encompass such changes and modifications as fall within the scope of the appended claims.

What is claimed is:

1. A DCR method, used in a thermal imaging system with an optical path that includes an array of thermal image detectors, for providing a passive source of thermal reference radiation to the thermal image detector array; comprising the steps:

during selected DCR intervals, redirecting the optical path for the thermal imaging system to include a DCR imaging path such that a redirected optical bundle is introduced into the DCR imaging path as a DCR imaging bundle; and in the DCR imaging path, performing optical operations on the DCR imaging bundle and then reintroducing the DCR imaging bundle back into the optical path of the thermal imaging system to form a pupil onto an image of a thermal scene;

such that scene-average radiation is provided to the thermal image detector array as a thermal reference.

2. The DCR method of claim 1, comprising the steps:

directing the DCR imaging bundle to a first reflective surface;

directing the DCR imaging bundle to a positive reflective surface that reflects the bundle with positive power;

directing the DCR imaging bundle to second and third reflective surfaces; and directing the DCR imaging bundle on an exit path for reintroduction back into the optical path of the thermal imaging system.

3. The DCR method of claim 1, wherein the step of redirecting the optical path for the thermal imaging system to include a DCR imaging path comprises the steps:

during selected first DCR intervals, redirecting the optical path for the thermal imaging system to include a DCR imaging path such that a redirected optical bundle is introduced into the DCR imaging path as a CDR imaging bundle;

during selected second DCR intervals, redirecting the optical path for the thermal imaging system into a DCR imaging path such that a portion of a redirected optical bundle is introduced into the DCR imaging path as a DCR imaging bundle, and a portion of the redirected optical bundle is reflected as a DCR reflected bundle and reintroduced back into the optical path of the thermal imaging system;

such that, during the first DCR intervals, scene-average radiation is provided to the thermal image detector array as a first thermal reference, and, during the second DCR intervals, a composite of scene-average radiation and some form of the DCR reflected bundle is provided to the thermal image detector array as a second thermal reference.

4. The DCR method of claim 1, wherein the step of performing optical operations on the DCR imaging bundle to from a pupil comprises the steps:

folding the DCR imaging bundle onto a predetermined number of fold paths;

on at least one of the fold paths, focusing the DCR imaging bundle with positive power; and reintroducing the folded and focused DCR imaging bundle back into the optical path of thermal imaging system to form a pupil at a selected location.

5. A thermal imaging system including DCR pupil imaging optics for providing a passive DCR thermal reference source, comprising:

a thermal detector array;

imaging optics for imaging a thermal scene onto said detector array; and

DCR pupil imaging optics for forming a pupil on an image of the scene, such that the detector receives scene-average radiation as a thermal reference;

during selected DCR intervals, said imaging optics redirects the optical path for the detector array to include the DCR pupil imaging optics.

6. The thermal imaging system including DCR pupil imaging optics defined in claim 5, wherein said DCR pupil imaging optics comprises:

input/output optics for intercepting, during selected DCR intervals, an input optical bundle incident from the thermal imaging system, and after a predetermined number of fold paths within the pupil-/image reversal device, reintroducing the optical bundle into the thermal imaging system; and a positive reflective element for reflecting with positive power;

said positive reflective element and said input/output optics being cooperatively configured such that an intercepted optical bundle is directed along a predetermined number of fold paths, at least one of which includes the positive reflective element, until being directed on an exit path to the input-/output optics, such that the focused and folded optical bundle forms a pupil at a desired image location.

7. The thermal imaging system including DCR pupil imaging optics defined in claim 6, wherein said input-/output optics comprises:

an input reflective element; and an output reflective element;

said input and output reflective elements being transmissive to an optical bundle incident at transmit-angles of incidence, and reflective to an optical bundle incident at a reflect-angles of incidence;

such that an optical bundle incident to said input reflective element at a transmit-angle of incidence is introduced into the pupil/image reversal device, and within the device, the optical bundle propagates along predetermined internal fold paths incident to said input and output reflective elements at reflect-angles of incidence, until being directed on an exit path to said output reflective element at a transmit angle of incidence for reintroduction into the optical system.

8. The thermal imaging system including DCR pupil imaging optics defined in claim 7, further including at least one intermediate fold element for reflecting an incident optical bundle.

9. The thermal imaging system including DCR pupil imaging optics defined in claim 7, wherein said positive reflective element and said input and output reflective elements are surfaces formed on a prism of refractive material.

10. The thermal imaging system including DCR pupil imaging optics defined in claim 9, wherein said input and output reflective surfaces use TIR for reflection.

11. The thermal imaging system including DCR pupil imaging optics defined in claim 10, wherein said prism includes a zinc selenide immersion medium.

12. The thermal imaging system including DCR pupil imaging optics defined in claim 9, wherein said prism further includes at least one intermediate fold surface for reflecting an optical bundle.

13. The thermal imaging system including DCR pupil imaging optics defined in claim 9, wherein said positive reflective surface is coated reflective.

14. The thermal imaging system including DCR pupil imaging optics defined in claim 9, wherein said input and output reflective surfaces are coated with an anti-reflective coating.

15. The thermal imaging system including DCR pupil imaging optics defined in claim 1, wherein said imaging optics comprises:

an imager for imaging the thermal scene on the detector array; and an objective for directing the thermal scene radiation to said imager;

said DCR pupil imaging optics being integrated with said imager; and said imager including an indexer for selectively, during the DCR intervals, redirecting the optical path of the detector array to include the DCR pupil imaging optics.

16. The thermal imaging system including DCR pupil imaging optics defined in claim 15, wherein said DCR pupil imaging optics is located substantially at an intermediate image plane for the detector array.

17. The thermal imaging system including DCR pupil imaging optics defined in claim 5, wherein said imaging optics comprises:
- an imager for imaging the thermal scene on the detector array; and
- an objective for directing thermal scene radiation to said imager; and
- a scanner located optically between said imager and said objective for scanning the detector array across the thermal scene;
- said DCR pupil imaging optics being integrated with said objective; and
- said scanner being selectively, during DCR intervals, operable to redirect the optical path of the detector array to include the DCR pupil imaging optics.

18. The thermal imaging system including DCR pupil imaging optics defined in claim 17, wherein said DCR pupil imaging optics is located substantially at an intermediate image plane for the detector array.

19. The thermal imaging system including DCR pupil imaging optics defined in claim 5, wherein:
- during selected first DCR intervals, said input/output optics intercepts an input optical bundle incident from said imaging optics as a DCR imaging bundle;
- during selected second DCR intervals, said input/output optics intercepts a portion of an input optical bundle incident from said imaging optics as a DCR imaging bundle, and reflects back into the thermal imaging system a portion of the input optical bundle as a DCR reflected bundle;
- such that, during the first DCR intervals scene-average radiation is provided to the detector array as a first thermal reference, and during the second DCR intervals a composite of scene-average radiation and some form of the DCR reflected bundle is provided to the detector array as a second thermal reference.

* * * * *